No. 755,871. PATENTED MAR. 29, 1904.
T. A. HELM.
APPARATUS FOR TREATING ORES.
APPLICATION FILED FEB. 25, 1903.
NO MODEL. 2 SHEETS—SHEET 1.

Witnesses
Edwin F. McKee
A. G. Heylmun

Inventor
Thomas A. Helm
By Victor J. Evans
Attorney

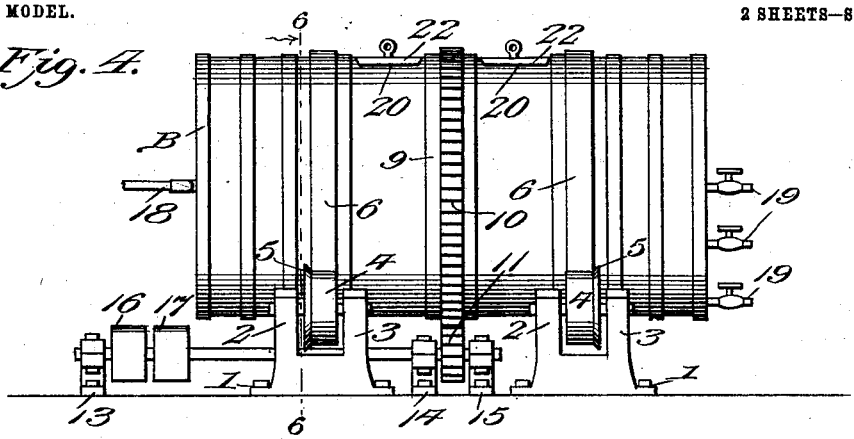
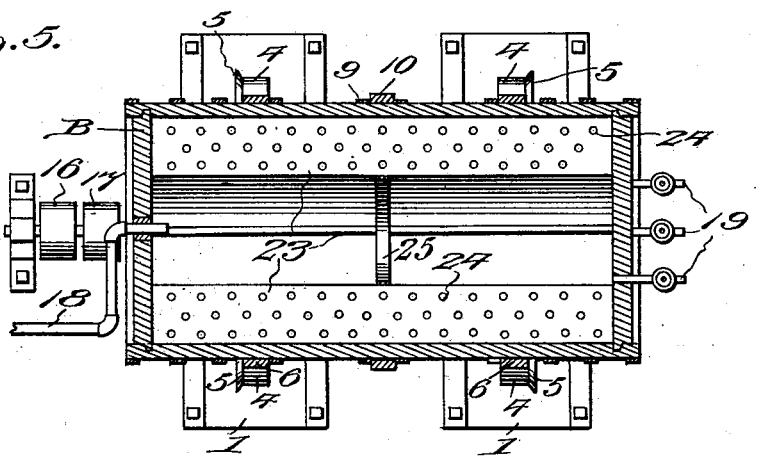
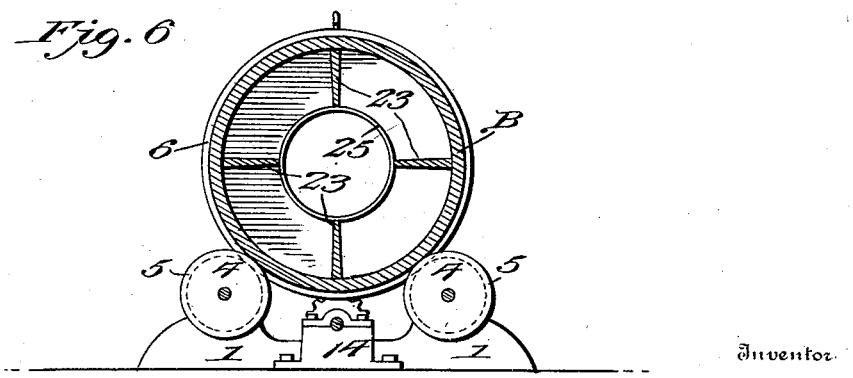

No. 755,871. Patented March 29, 1904.

UNITED STATES PATENT OFFICE.

THOMAS A. HELM, OF SALT LAKE CITY, UTAH.

APPARATUS FOR TREATING ORE.

SPECIFICATION forming part of Letters Patent No. 755,871, dated March 29, 1904.

Application filed February 25, 1903. Serial No. 145,063. (No model.)

*To all whom it may concern:*

Be it known that I, THOMAS A. HELM, a citizen of the United States, residing at Salt Lake City, in the county of Salt Lake and State of Utah, have invented new and useful Improvements in Apparatus for Treating Ores, of which the following is a specification.

My invention has relation to apparatus for treating ores containing gold and silver or other precious metals which are susceptible of being taken up in suspension by a liquid solvent, and is especially useful for treating gold-bearing ores which have been subjected to the cyanid process or other similar treatment; and the object is to provide an apparatus of the kind named and for the purposes intended which is of simplified construction, certain in effecting the purposes, and durable in use.

The invention embodies a rotatable tank, means within the tank to agitate the contents, means to force air within the tank, and means to discharge the contents, and associated with the above-stated tank a second tank of like general construction and associated equipments and interior blades provided with perforations, all as will be hereinafter fully described, and the novelty thereof particularly pointed out and distinctly claimed.

I have fully and clearly illustrated my improvements in the accompanying drawings, to be taken as part hereof, and wherein—

Figure 1:
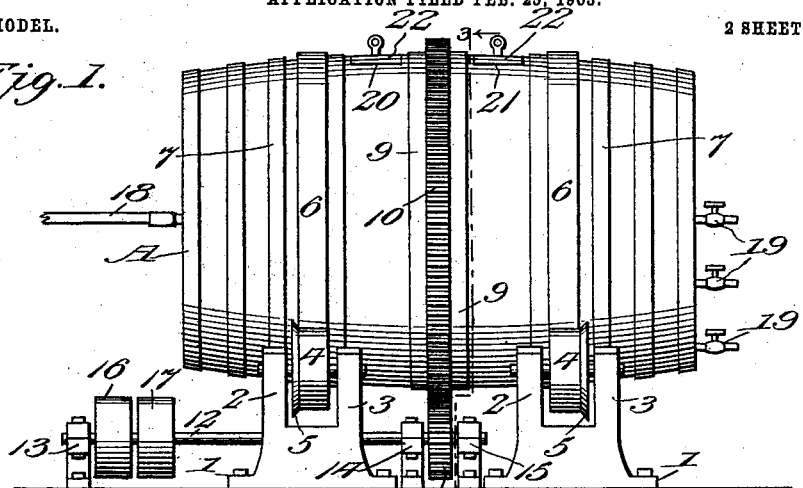
Figure 2:
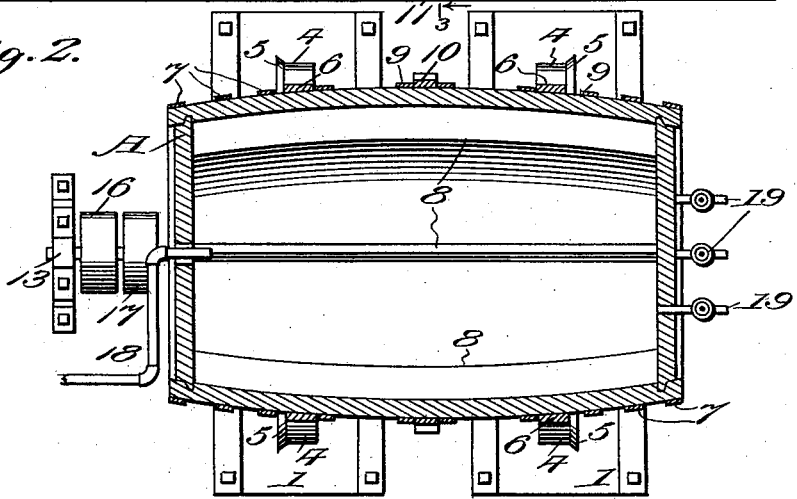
Figure 3:
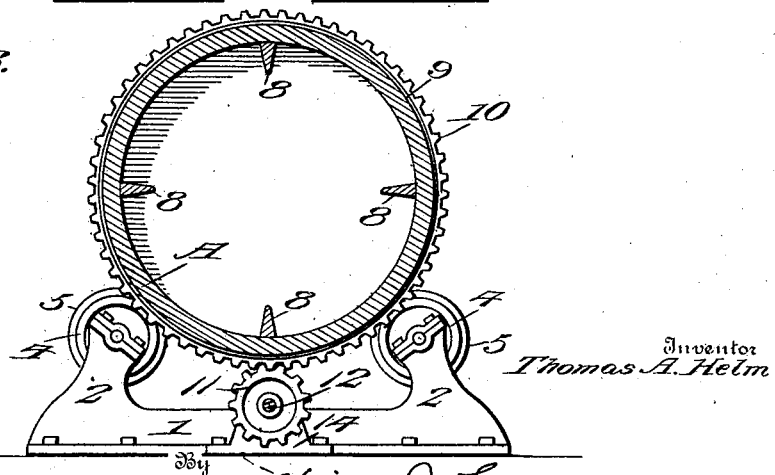

Figure 1 is a side view in elevation of the tank in which the primary or first leaching is effected, showing the supports and means for rotating the tank. Fig. 2 is a central vertical longitudinal section through the tank shown in Fig. 1, showing the inwardly-directed radial blades. Fig. 3 is a transverse vertical section through the tank, taken on the line 3 3 of Fig. 1. Fig. 4 is a side elevation of the tank in which the material is deposited and treated after its treatment in the tank shown in Figs. 1, 2, and 3. Fig. 5 is a longitudinal horizontal section taken centrally through Fig. 4, showing the perforated stirring-blades. Fig. 6 is a transverse vertical section taken on the line 6 6 of Fig. 4.

In the drawings like elements and parts appearing in different illustrations are designated by the same reference notations.

It will be premised that one of the primary purposes of my invention is to provide improved means for a perfect and thorough percolation of the material, and thereby save and wash the slimes and rescue the valuable products. It may be further stated as a preliminary observation that in the use of my improved apparatus the ores may be very finely pulverized, thus making the leaching chemicals reach all values in the mass of pulverized material.

The supports for the respective tanks and the mechanism for rotating the tanks are identical and are so referred to.

Referring to the drawings, 1 designates strong base-plates, at each end of which are erected or formed vertical standards 2 3, in which are journaled the axles of rollers 4, formed with annular edge flanges 5, which engage against the edges of annular hoops 6 on the tanks.

A designates the tank which first receives the pulverized ores and the solvent solution. This tank is made of such dimensions and capacity as may fit it to hold the quantity of material to be treated, varying from twenty to sixty tons. The tank A is made in barrel shape and is strongly bound by a suitable number of hoops 7 and also by the annular bands 6, as indicated in the drawings. In the interior of the tank A, extending the length thereof, are blades 8, constituting stirrers, which thoroughly mix and agitate the contents when the tank is rotated. These blades are positioned opposite to each other at the vertical and horizontal radii of the axis of the tank, as shown, and extend the desired distance toward the center of the tank. Around the middle of the tank A is arranged and secured a strong band 9, formed with an annular rack-gear 10, which is engaged by a driving-pinion 11, fixed on a shaft 12, journaled in supports 13 14 15, and on the shaft 12 are mounted a fast pulley 16 and a loose pulley 17, adapted to carry a driving-belt (not shown) in a well-known manner. It will be perceived that when the pinion 11 is rotated the tank will be turned on its axis by the engagement of the pinion with the annular rack. Centrally through one of the heads of the tank A is let a pipe 18, which extends a proper distance inward, through which air is forced to assist in the agitation of the material and in extracting the metallic constituents, and at the other end of the tank are inserted a number of faucets 19, through which the liquid solutions are discharged under the pressure of the admitted air.

In the tank are formed manholes 20 21, through which the pulp material is supplied and removed. The manholes are closed by suitable closures 22.

B designates the slime-washing tank, which is in the form of a true cylinder mounted on supporting-frames and rollers actuated by the same kind of mechanism and equipped with the same character of pipe, faucets, and manholes, and where the parts shown in tank B are identical with equivalents in the tank A they are identified by like reference designations. In the tank B are secured blades 23, fastened to the inner face of the tank and extending radially inward the proper distance toward the center, substantially as shown. The blades 23 are provided with holes 24, through which the solution strains or percolates. In the tank, between the ends of the blades, is placed a circular brace-ring 25, which holds the blades firmly in position relatively.

The tank A in practice may be placed in relative elevated position to the tank B, so that the contents of the former may be discharged through the manholes therein and fall through the manholes in tank B into the interior.

The operation of the apparatus may be stated as follows: The tank A is supplied with the requisite charge of the solvent solution and then the pulp or pulverized material introduced and the manholes closed. The tank is then revolved while the air is admitted. After the saturation of the solution has been accomplished the saturated solution is drawn off through the faucets into the gold-tank. The slimes are also drawn off and deposited in tank B or siphoned from tank A into tank B, where they are washed and then drawn off into the gold-solution tank for further treatment. The pulp or ore in the tank A may then be washed with a weak solvent solution, which after a time is drawn off and transferred to tank B and from there to the gold-tank for further treatment. After the requisite treatment the residual contents of the tank A are dumped out.

What I claim is—

1. An apparatus for treating pulverized auriferous ores, comprising a rotatable cylindrical tank, radially-depending blades in the tank extending the length thereof, a circular brace-frame disposed between the inner ends of the radial blades, an air-pipe leading into the tank, faucets to draw off a liquid from the tank, and means to rotate the tank.

2. An apparatus for treating pulverized auriferous ores, comprising a cylindrical rotatable tank, radially-depending blades in the tank extending the length thereof, and provided with perforations, a circular brace-frame disposed between the inner ends of the radial blades, an air-pipe leading into the tank, faucets to draw off a liquid from the tank, and means to rotate the tank.

In testimony whereof I affix my signature in presence of two witnesses.

THOMAS A. HELM.

Witnesses:
   E. G. HINES,
   E. G. PIERCE.